United States Patent
Ihara et al.

(10) Patent No.: US 10,108,848 B2
(45) Date of Patent: Oct. 23, 2018

(54) ATTRIBUTE FACTOR ANALYSIS METHOD, DEVICE, AND PROGRAM

(71) Applicant: NEC SOLUTION INNOVATORS, LTD., Koto-ku, Tokyo (JP)

(72) Inventors: Yasuyuki Ihara, Tokyo (JP); Masashi Sugiyama, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 87 days.

(21) Appl. No.: 15/127,216

(22) PCT Filed: Mar. 28, 2014

(86) PCT No.: PCT/JP2014/059906
§ 371 (c)(1),
(2) Date: Sep. 19, 2016

(87) PCT Pub. No.: WO2015/145785
PCT Pub. Date: Oct. 1, 2015

(65) Prior Publication Data
US 2017/0109567 A1    Apr. 20, 2017

(51) Int. Cl.
*G06K 9/50* (2006.01)
*G06K 9/00* (2006.01)
*G06T 7/11* (2017.01)

(52) U.S. Cl.
CPC ..... *G06K 9/00228* (2013.01); *G06K 9/00268* (2013.01); *G06T 7/11* (2017.01)

(58) Field of Classification Search
CPC .............. G06K 9/00268–9/00281; G06K 9/00302–9/00315
See application file for complete search history.

(56) References Cited

U.S. PATENT DOCUMENTS

2012/0099783 A1*   4/2012   Bourdev ............ H04N 5/23219
382/159

FOREIGN PATENT DOCUMENTS

JP        H11-175724 A       7/1999

OTHER PUBLICATIONS

Juan E. Tapia et al., "Gender Classification Based on Fusion of Different Spatial Scale Features Selected by Mutual Information From Histogram of LBP, Intensity, and Shape", IEEE Transactions on Information Forensics and Security, vol. 8, No. 3, pp. 1 bib sheet + pp. 488-499, published on-line Jan. 23, 2013.*

(Continued)

Primary Examiner — Brian Werner

(57) ABSTRACT

This invention relates to a method of analyzing a factor of an attribute based on a case sample set containing combinations of image data and attribute data associated with the image data. The attribute factor analysis method includes: a division step of dividing an image region of the image data forming each element of the case sample set into parts in a mesh shape of a predetermined sample size; a reconstruction step of reconstructing, based on the case sample set, the case sample sets for the respective parts to obtain reconstructed case sample sets; an analysis step of analyzing, for each of the reconstructed case sample sets, a dependency between an explanatory variable representing a feature value of image data on each part and an objective variable representing the attribute data, to thereby obtain an attribute factor analysis result; and a visualization step of visualizing the attribute factor analysis result to produce the visualized attribute factor analysis result.

21 Claims, 7 Drawing Sheets

(56) References Cited

OTHER PUBLICATIONS

Suzuki, T., Sugiyama, M., Sese, J., & Kanamori, T., "Approximating Mutual Information by Maximum Likelihood Density Ratio Estimation", Proceedings of the Workshop in New Challenges for Feature Selection in Data Mining and Knowledge Discovery 2008 (FSDM2008), JMLR Workshop and Conference Proceeding, vol. 4, pp. 5-20, 2008.

Suzuki, T., Sugiyama, M., Kanamori, T., & Sese, J., "Mutual Information Estimation Reveals Global Associations between Stimuli and Biological Processes", BMC Bioinformatics, vol. 10, No. 1, pp. S52, 2009.

Seiki Yoshimori et al., "Importance Analysis of Facial Part in an Impression Analysis", Proceedings of the 2008 IEICE General Conference Kiso Kyokai, Mar. 5, 2008, p. 275.

"'Kao no Mitame no Inshodo' o Suitei sum Gijutsu [Technique of estimating impression ratings of the facial appearance]", Fragrance Journal, the Mar. 2013 issue, Mar. 15, 2013, p. 87.

International Search Report for PCT Application No. PCT/JP2014/059906, dated Jul. 1, 2014.

English translation of Written opinion for PCT Application No. PCT/JP2014/059906.

\* cited by examiner

ATTRIBUTE FACTOR ANALYSIS METHOD, DEVICE, AND PROGRAM

This application is a National Stage Entry of PCT/JP2014/059906 filed on Mar. 28, 2014, the content of all of which is incorporated herein by reference, in its entirety.

TECHNICAL FIELD

This invention relates to a method of estimating an attribute of an object, and more particularly, to a method, a device, and a program for analyzing a factor of an attribute.

BACKGROUND ART

There is known "supervised learning" as a technique of machine learning (for example, refer to Patent Literature 1). In supervised learning, a case data set containing combinations of input data (observed data) and output data (implication, attribute, or result of observed data) is regarded as "advice from a supervisor", and a machine (computer) learns based on the case data set. The phrase "learning" in this context means creating a function model for predicting or estimating output for input data whose output is unknown.

Next, a specific description is given taking facial image recognition as an example. In this facial image recognition, a description is given of a case in which sex (one of human attributes) is estimated based on a facial image.

At the time of learning, a computer constructs a function model based on a case data set containing facial images of females and males. At the time of evaluation, when a facial image (for example, female facial image) whose sex is unknown is supplied, the computer produces "female" as its sex based on the input data and the function model.

As a method of calculating a magnitude of a correlation between an explanatory variable representing a feature value of an object and an objective variable representing an attribute or a result, there are known, for example, a method of calculating a correlation value in a sub-space (one-dimension) of canonical correlation analysis (CCA), maximum likelihood mutual information (MLMI), which is a method of calculating mutual information (MI) (for example, see Non Patent Literature 1), or least-squares mutual information (LSMI), which is a method of calculating squared-loss mutual information (SMI) (for example, see Non Patent Literature 2).

CITATION LIST

Patent Literature

Patent Literature 1: JP-A-H11-175724

Non Patent Literature

Non Patent Literature 1: Suzuki, T., Sugiyama, M., Sese, J., & Kanamori, T. "Approximating Mutual Information by Maximum Likelihood Density Ratio Estimation" In Y. Saeys, H. Liu, I. Lnza, L. Wehenkel, and Y. Van de Peer (Eds.), Proceedings of the Workshop on New Challenges for Feature Selection in Data Mining and Knowledge Discovery 2008 (FSDM2008), JMLR Workshop and Conference Proceeding, vol. 4, pp. 5-20, 2008
Non Patent Literature 2: Suzuki, T., Sugiyama, M., Kanamori, T., & Sese, J. "Mutual Information Estimation Reveals Global Associations between Stimuli and Biological Processes" BMC Bioinformatics, vol. 10, no. 1, pp. S52, 2009

SUMMARY OF INVENTION

Technical Problem

In the related-art supervised learning described above, output (e.g., sex) can only be estimated based on the input data (facial image).

In the related art, when a set $\{(x_i, y_i)\}$ of case data (a pair of the feature value and the attribute of an object) is given, there is no technology for analyzing an overall tendency of "which explanatory variable X representing the feature value of an object tends to be a factor of an objective variable Y representing an attribute or a result", and visualizing the result.

First, a first example will be described. A database of male and female facial images is constructed, but there is no technology for analyzing an overall tendency of which facial part tends to be a decisive factor of sex. In this context, the phrase "which facial part tends to be a decisive factor of sex" means which facial part has an influence on "masculinity" or "femininity". In other words, what determines the feature of males and females is unknown.

Next, a second example will be described. Impressions of "prettiness" are evaluated for a database of female facial images, but there is no technology for analyzing an overall tendency of which facial part is a decisive factor of the attribute (impression of "prettiness"). In other words, what point determines "prettiness" is unknown.

It is an object of this invention to provide an attribute factor analysis method, a device, and a program, which are capable of analyzing a factor of an attribute.

Solution to Problem

A mode of the present invention is an attribute factor analysis method, which is a method of analyzing a factor of an attribute with use of an attribute factor analysis device based on a case sample set containing combinations of image data and attribute data associated with the image data, the attribute factor analysis method comprising a division step of dividing an image region of the image data forming each element of the case sample set into parts in a mesh shape of a predetermined sample size, a reconstruction step of reconstructing, based on the case sample set, the case sample sets for the respective parts to obtain reconstructed case sample sets, an analysis step of analyzing, for each of the reconstructed case sample sets, a dependency between an explanatory variable representing a feature value of image data on each part and an objective variable representing the attribute data, to thereby obtain an attribute factor analysis result, and a visualization step of visualizing the attribute factor analysis result to produce the visualized attribute factor analysis result.

Advantageous Effects of Invention

According to this invention, it is possible to analyze a factor of an attribute.

DESCRIPTION OF EMBODIMENTS

First Embodiment

Figure 1:
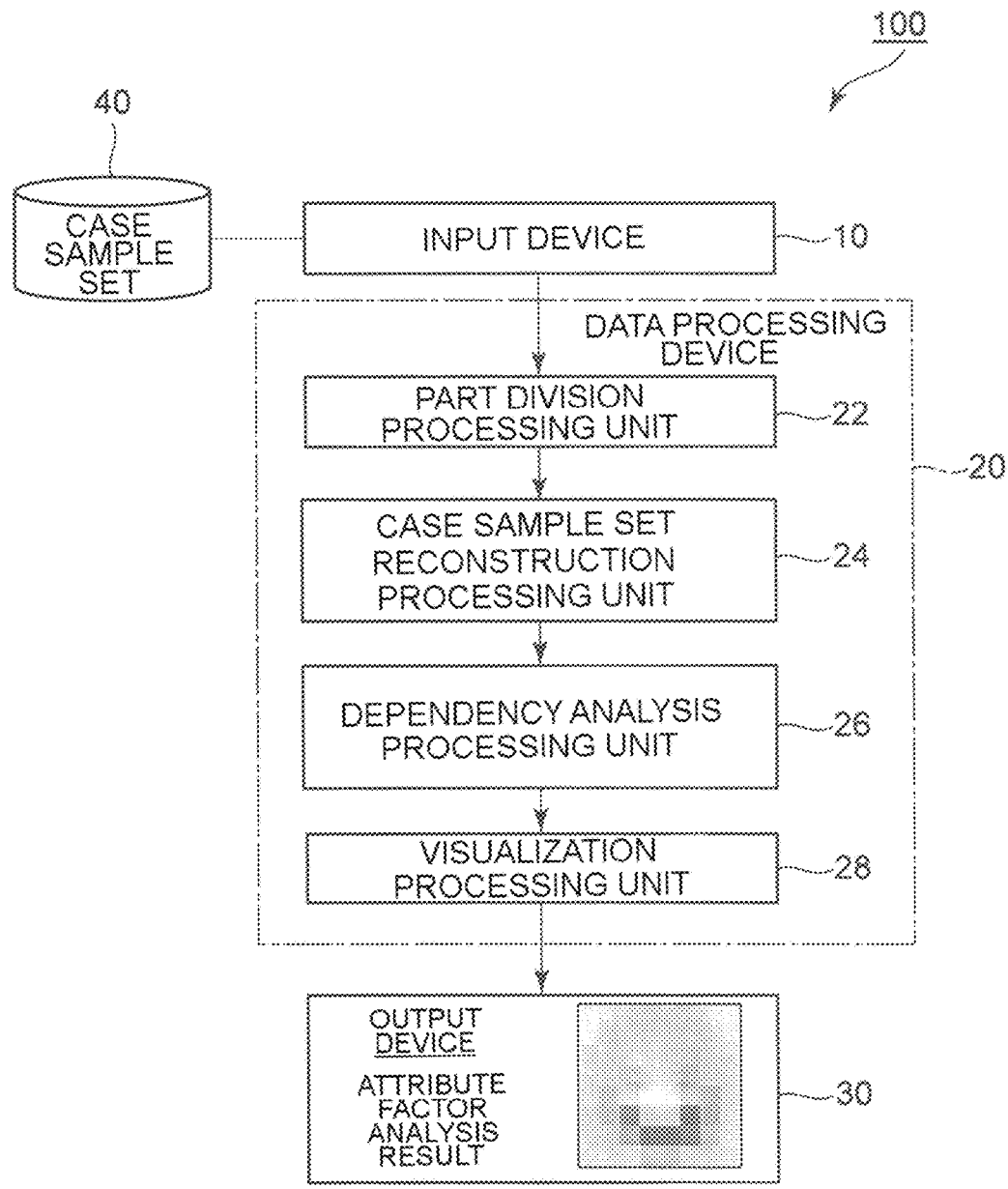
FIG. 1 is a block diagram for illustrating a configuration of an attribute factor analysis device according to a first embodiment of this invention.

FIG. 1 is a block diagram for illustrating a configuration of an attribute factor analysis device 100 according to a first embodiment of this invention. A description is simplified or omitted for a configuration having low relevance to this invention.

The illustrated attribute factor analysis device 100 can be realized by a computer configured to operate in accordance with program control. The attribute factor analysis device 100 comprises an input device 10 configured to input data, a data processing device 20, an output device 30 configured to produce a processing result of the data processing device 20, and an auxiliary storage device 40 configured to function as various kinds of databases.

Although not shown, the data processing device 20 comprises a read-only memory (ROM) storing a program, a random-access memory (RAM) to be used as a working memory temporarily storing data, and a central processing unit (CPU) configured to process data stored in the RAM in accordance with the program stored in the ROM.

The auxiliary storage device 40 is configured to accumulate a case sample set. The case sample set is a set containing combinations of image data and attribute data associated with this image data. In this example, the number of samples is, for example, 2,600. It is to be understood that the number of samples is not limited thereto.

Further, in the illustrated example, the image data is facial image data. Further, the attribute data is data representing impressions of appearances of faces.

The image data is not necessarily facial image data, but normalization processing is performed on all the image data. In this context, the normalization processing means performing positioning at a particular part. For example, when the image data is facial image data, the normalization processing means performing positioning at both eyes.

The illustrated attribute factor analysis device 100 is a device configured to analyze whether or not there is a correlation between the feature of face-part data and an impression of an appearance.

The input device 10 is configured to supply a case sample set stored in the auxiliary storage device 40 into the data processing device 20.

The data processing device 20 comprises a part division processing unit 22, a case sample set reconstruction processing unit 24, a dependency analysis processing unit 26, and a visualization processing unit 28.

The part division processing unit 22 is configured to divide an image region of image data contained in a case sample set into parts in a mesh shape of a part of a predetermined sample size.

The case sample set reconstruction processing unit 24 is configured to reconstruct, based on the case sample set, case sample sets for respective parts, to obtain reconstructed case sample set.

The dependency analysis processing unit 26 is configured to analyze, for each of the reconstructed case sample sets, a dependency between an explanatory variable X representing a feature value of image data of each part and an objective variable Y representing attribute data, to obtain an attribute factor analysis result.

The visualization processing unit 28 is configured to visualize the attribute factor analysis result to produce the visualized attribute factor analysis result to the output device 30.

Next, a description will be given in detail of an operation of each processing unit of the data processing device 20.

Figure 2:
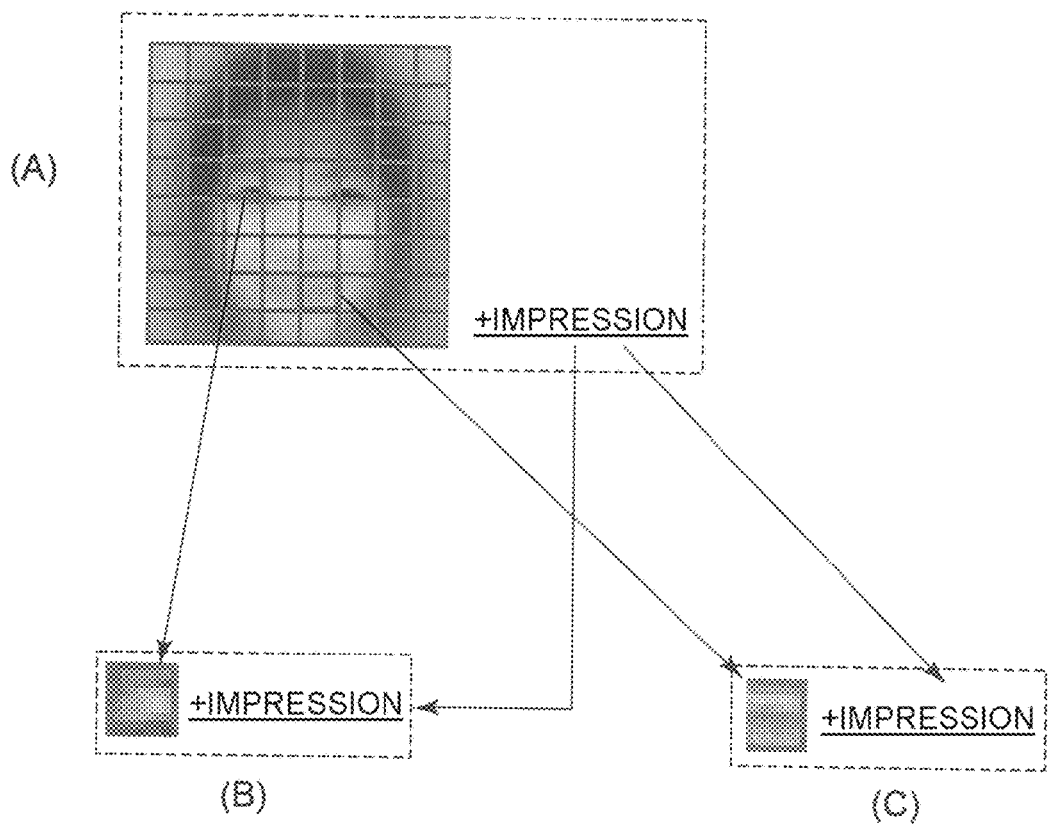
FIG. 2 shows diagrams for illustrating one example of a case sample relating to a facial image and examples of a reconstructed case sample.

FIG. 2(A) is a diagram for illustrating one example of a case sample relating to a facial image. The case sample is a combination of the explanatory variable X representing a feature value of facial image data and the objective variable Y representing an attribute "impression" of a face. As described above, in the case of this example, 2,600 case samples of this kind are accumulated in the auxiliary storage device 40.

The part division processing unit 22 determines a part division method (mesh division method) of the explanatory variable X in accordance with the purpose of analysis, customer needs, and the like. In this example, the part division processing unit 22 first normalizes the facial image data at a position of both eyes for all the 2,600 facial image samples. In this example, one piece of image data is (64×64) pixels.

Next, the part division processing unit 22 divides the normalized facial image data into pieces of block image data of (8×8) pixels. Thus, in the case of this example, the part division processing unit 22 obtains 64 pieces of block image data as illustrated in FIG. 2(A).

In this case, an elaborated part division technique needs to be used. This point will be described later.

The case sample set reconstruction processing unit 24 reconstructs, based on the case sample set, case sample sets for respective parts that are determined by the part division processing unit 22.

FIG. 2(B) and FIG. 2(C) are each a diagram for illustrating an example of a reconstructed case sample. FIG. 2(B) is an illustration of a case sample reconstructed for a right-eye image, and FIG. 2(C) is an illustration of a case sample reconstructed for a left-half mouth image.

As illustrated in FIG. 2(B), the case sample reconstructed for a right-eye image contains a combination of an explanatory variable X1 representing a feature value of the right-eye image and an objective variable Y representing an attribute "impression" of that value. In this example, the objective variable Y illustrated in FIG. 2(A) is used (appropriated) as it is as the attribute "impression". The number of case samples is 2,600.

As illustrated in FIG. 2(C), the case sample reconstructed for a left-half mouth image contains a combination of an explanatory variable X2 representing a feature value of the left-half mouth image and the objective variable Y representing an attribute "impression" of that value. The number of those case samples is also 2,600.

The feature value of image data is any selected one of feature values including RGB, gray scale, Laplacian, and Haar-like feature value. Further, each part uses a common feature value.

Further, in the first embodiment, four kinds of feature values of image data are given, but this invention is not limited thereto. It is to be understood that other feature values may be used.

The dependency analysis processing unit 26 analyzes a correlation (magnitude of correlation) between the explanatory variable X and the objective variable Y for each of the case sample sets (see FIG. 2(B) and FIG. 2(C)) reconstructed by the case sample set reconstruction processing unit 24.

In this example, as a method of calculating the magnitude of the correlation between the explanatory variable X and the objective variable Y, the dependency analysis processing unit 26 uses any one of a method of calculating a correlation value (correlation ratio) in a sub-space (one-dimension) of canonical correlation analysis (CCA), a method of calculating mutual information, and a method of calculating squared-loss mutual information. As described above, the method of calculating mutual information is disclosed in Non Patent Literature 1, and the method of calculating squared-loss mutual information is disclosed in Non Patent Literature 2.

In this example, the dependency analysis processing unit 26 uses the same technique common to respective parts.

Next, an outline of mutual information will be described.

It will be assumed that p(x) is a probability function of x, and p(y) is a probability function of y. In addition, it will be assumed that p(x,y) is a joint probability function of x and y.

It is assumed that x and y are independent of each other. In other words, it is assumed that a function of y=f(x) cannot be obtained. In this case, Expression (1) is satisfied.

$$p(x)p(x)=p(x,y) \quad (1)$$

In contrast, it is assumed that x and y are not independent of each other. In other words, it is assumed that a function of y=f(x) can be obtained. In this case, Expression (2) is satisfied.

$$I(X;Y) = \int_Y \int_X p(x,y) \log \frac{p(x,y)}{p(x)p(y)} dx\,dy > 0 \quad (2)$$

The mutual information is represented by Expression (3).

$$I(X;Y) = \int_Y \int_X p(x,y) \log \frac{p(x,y)}{p(x)p(y)} dx\,dy \quad (3)$$

In the first embodiment, three kinds of methods of calculating the magnitude of the correlation between the explanatory variable X and the objective variable Y are given, but this invention is not limited thereto. It is to be understood that other calculation methods may be used.

The visualization processing unit 28 visualizes the attribute factor analysis result produced by the dependency analysis processing unit 26, and produces the visualized attribute factor analysis result to the output device 30. In this case, the attribute factor analysis result refers to a region extracted as a factor of an attribute.

Figure 3:
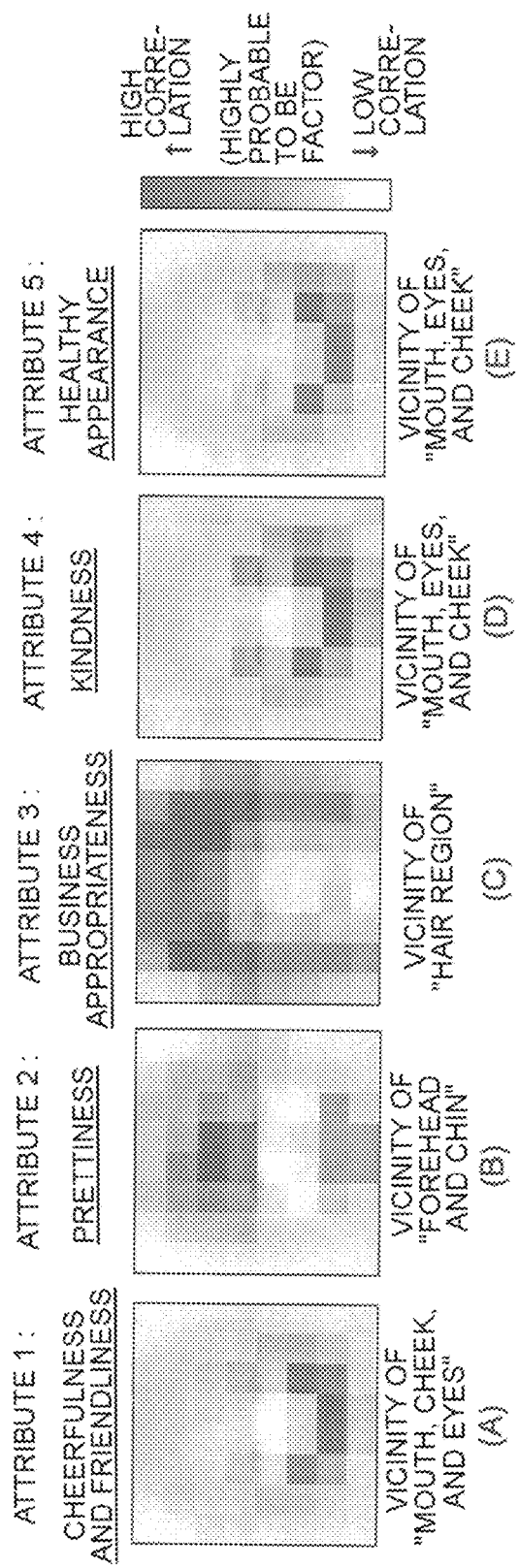
FIG. 3 shows diagrams each for illustrating an example of an attribute factor analysis result that is visualized by a visualization processing unit of FIG. 1.

To be more specific, the visualization processing unit 28 visualizes the absolute value of a correlation value, the magnitude of a numerical value of mutual information, or the magnitude of a numerical value of squared-loss mutual information for each block image (part), which is calculated by the dependency analysis processing unit 26, in a matrix (color-matrix) form as illustrated in FIG. 3.

In FIG. 3, as the attribute (impression), an example of five kinds of attributes, namely, "attribute 1", "attribute 2", "attribute 3", "attribute 4", and "attribute 5", is illustrated.

FIG. 3(A) is an illustration of an example of visualization of the attribute factor analysis result when the impression of the attribute 1 is "cheerfulness and friendliness". FIG. 3(B) is an illustration of an example of visualization of the attribute factor analysis result when the impression of the attribute 2 is "prettiness". FIG. 3(C) is an illustration of an example of visualization of the attribute factor analysis result when the impression of the attribute 3 is "business appropriateness". FIG. 3(D) is an illustration of an example of visualization of the attribute factor analysis result when the impression of the attribute 4 is "kindness". FIG. 3(E) is an illustration of an example of visualization of the attribute factor analysis result when the impression of the attribute 5 is "healthy appearance". The phrase "business appropriateness" means an impression of a person when he or she works in an office building.

As illustrated in FIG. 3(A) to FIG. 3(E), as the numerical value indicating the magnitude of a correlation becomes larger, the color becomes stronger (colored to a deep red). Further, through visualization of the attribute factor analysis result, it is possible to explain a difference in magnitude of a correlation for each part in an easy-to-understand manner.

For example, in the case of the impression "cheerfulness and friendliness" as illustrated in FIG. 3(A), the attribute factor analysis result indicates that the correlation is large in the vicinity of the mouth, cheeks, and eyes. In other words, it is indicated that the vicinity of the mouth, cheeks, and eyes is a decisive factor of the impression "cheerfulness and friendliness".

Further, in the case of the impression "prettiness" as illustrated in FIG. 3(B), the attribute factor analysis result indicates that the correlation is large in the vicinity of the forehead and the chin. In other words, it is indicated that the vicinity of the forehead and the chin is a decisive factor of the impression "prettiness".

In the case of the impression "business appropriateness" as illustrated in FIG. 3(C), the attribute factor analysis result indicates that the correlation is large in the vicinity of the hair region. In other words, it is indicated that the vicinity of the hair region is a decisive factor of the impression "business appropriateness".

In the case of the impression "kindness" as illustrated in FIG. 3(D), the attribute factor analysis result indicates that the correlation is large in the vicinity of the mouth, eyes, and cheeks. In other words, it is indicated that the vicinity of the mouth, eyes, and cheeks is a decisive factor of the impression "kindness".

In the case of the impression "healthy appearance" as illustrated in FIG. 3(E), the attribute factor analysis result indicates that the correlation is large in the vicinity of the mouth, eyes, and cheeks. In other words, it is indicated that the vicinity of the mouth, eyes, and cheeks is a decisive factor of the impression "healthy appearance".

The following points are understood as an overall tendency based on FIG. 3(A) to FIG. 3(E).

First, it is understood that some specific facial parts and the impression have a high correlation. To be more specific, it is understood that, aside from the magnitude of a correlation value, parts having a high correlation with a particular impression are almost common to each other (e.g., eyes and mouth) irrespective of the kind of feature value of a face or an analysis technique (CCA, MLMI, and LSMI).

Next, the position of a facial part having a high correlation is different depending on the kind of impression.

In the first embodiment, five kinds of impressions of a face are given, but this invention is not limited thereto. It is to be understood that at least one impression may be selected from those five kinds of impressions, or another impression may be used.

The respective units of the attribute factor analysis device 100 according to the first embodiment may be implemented by using a combination of hardware and software. In an embodiment employing a combination of hardware and software, the respective units are implemented as various kinds of means by operating a piece of hardware, e.g., a control unit (CPU), based on an attribute factor analysis program stored in the ROM. Further, the attribute factor analysis program may be recorded in a recording medium for distribution. The attribute factor analysis program recorded in the recording medium is read into a memory in a wired or wireless manner, or via the recording medium itself, to thereby operate the control unit and other components. Examples of the recording medium include an optical disc, a magnetic disk, a semiconductor memory device, and a hard disk.

The attribute factor analysis device 100 configured in this manner according to the first embodiment can analyze the factor of an attribute (impression).

Second Embodiment

Figure 4:
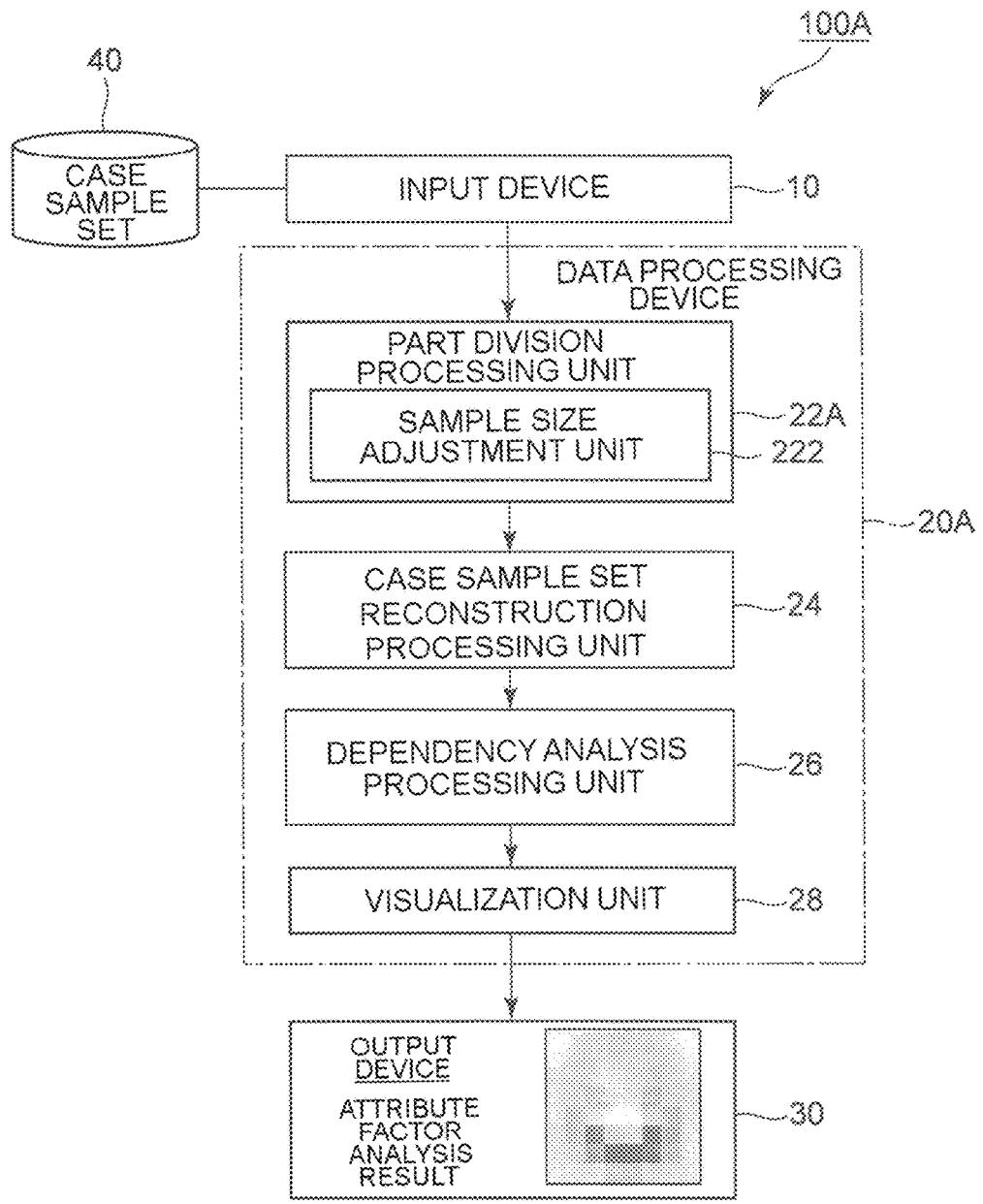
FIG. 4 is a block diagram for illustrating a configuration of an attribute factor analysis device according to a second embodiment of this invention.

FIG. 4 is a block diagram for illustrating a configuration of an attribute factor analysis device 100A according to a second embodiment of this invention. A description is simplified or omitted for a configuration having low relevance to this invention.

The illustrated attribute factor analysis device 100A can be realized by a computer configured to operate in accordance with program control. The attribute factor analysis device 100A has the same configuration as the attribute factor analysis device 100 illustrated in FIG. 1 for operation except that the configuration of the data processing device is different as described later. Thus, the data processing device is denoted by a reference numeral 20A. The same components as those illustrated in FIG. 1 are denoted by the same reference numerals, and a description thereof is omitted for the sake of simplicity of description.

The illustrated data processing device 20A has the same configuration as the data processing device 20 illustrated in FIG. 1 for operation except that the configuration of the part division processing unit is different as described later. Thus, the part division processing unit is denoted by a reference numeral 22A.

In addition to performing the part division processing by the part division processing unit 22 illustrated in FIG. 1, the part division processing unit 22A further includes a sample size adjustment unit 222 configured to previously calculate the magnitude of the correlation between the explanatory variable X and the objective variable Y for each piece of part data, and to adjust a sample size.

Next, an operation of the sample size adjustment unit 222 will be described in more detail.

Figure 5:
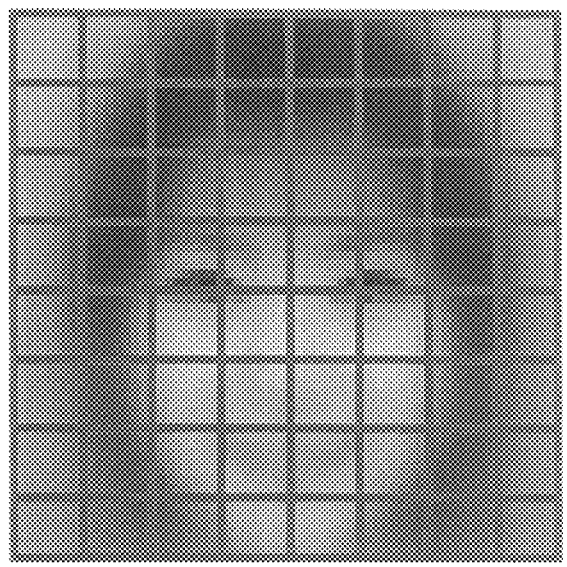
FIG. 5 is a diagram for illustrating adjustment of a sample size.

As illustrated in FIG. 5, the magnitude of a sample size (in the case of FIG. 5, the size of block image data) needs to be determined in advance appropriately. In the case of FIG. 5, each piece of block image data is (8×8) pixels. Further, the image region of image data is divided into parts in a mesh shape of (8×8) pixels. That is, each piece of image data is divided into 64 pieces of block image data.

When the sample size is too small, the magnitudes of the correlation cannot be compared. That is, the correlation with the objective variable Y is extremely small for every piece of part data.

In contrast, when the sample size is too large, the original purpose of analysis cannot be achieved. In other words, it is difficult to identify a part having a high relevance to the objective variable Y.

In view of this, the sample size adjustment unit 222 previously calculates the magnitude of the correlation between the explanatory variable X and the objective variable Y for each piece of part data while appropriately changing the sample size, and specifies an appropriate sample size while adjusting a balance between "variance of correlation values for respective parts (the larger the better)" and "size of a part to be analyzed (the smaller the better)".

The respective units of the attribute factor analysis device 100A according to the second embodiment may be implemented by using a combination of hardware and software. In the embodiment employing a combination of hardware and software, the respective units are implemented as various kinds of means by operating a piece of hardware, e.g., a control unit (CPU), based on an attribute factor analysis program stored in the ROM. Further, the attribute factor analysis program may be recorded in a recording medium for distribution. The attribute factor analysis program recorded in the recording medium is read into a memory in a wired or wireless manner, or via the recording medium itself, to thereby operate the control unit and other components. Examples of the recording medium include an optical disc, a magnetic disk, a semiconductor memory device, and a hard disk.

The attribute factor analysis device 100A configured in this manner according to the second embodiment can easily analyze the factor of an attribute (impression).

Third Embodiment

Figure 6:
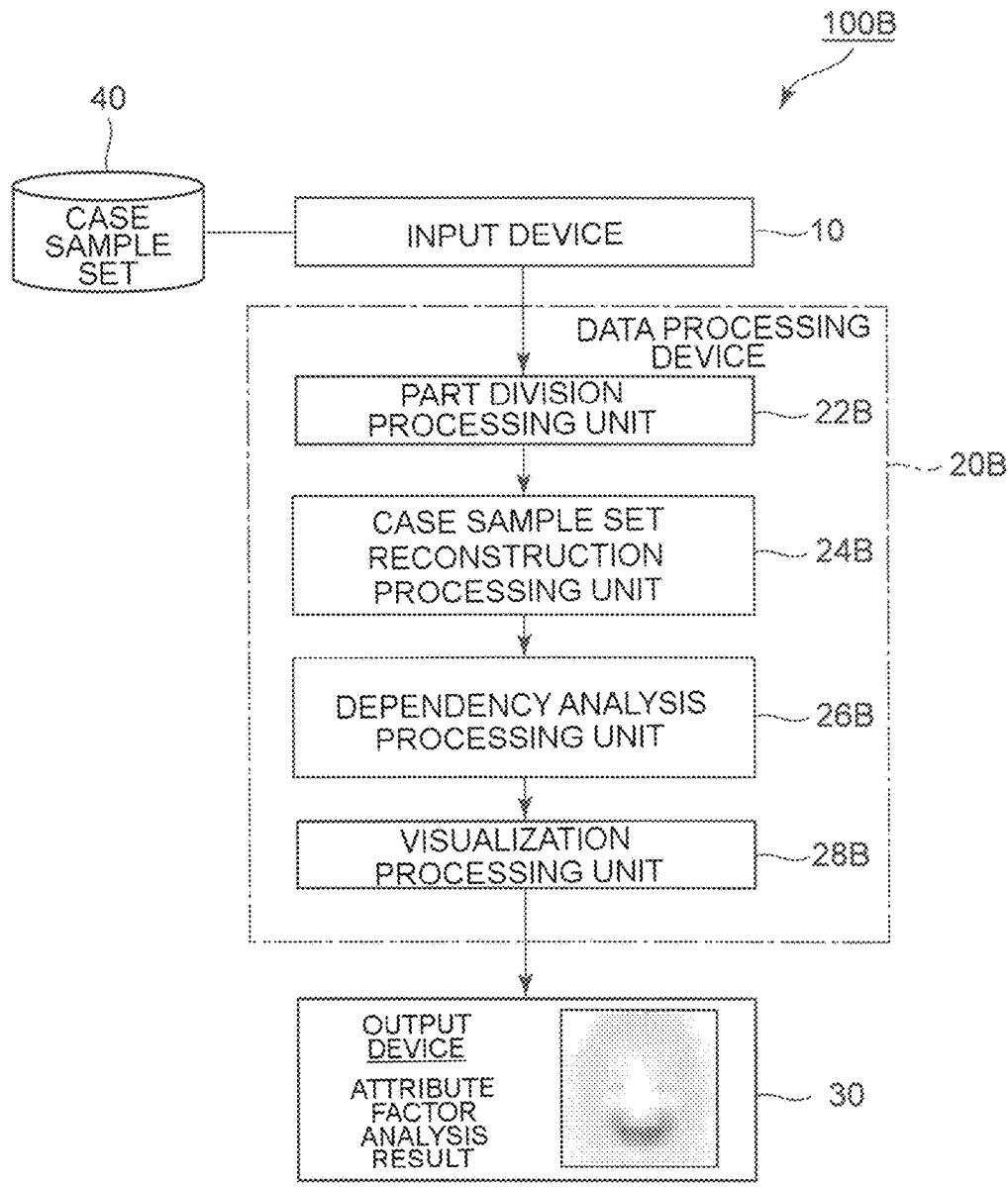
FIG. 6 is a block diagram for illustrating a configuration of an attribute factor analysis device according to a third embodiment of this invention.

FIG. 6 is a block diagram for illustrating a configuration of an attribute factor analysis device 100B according to a third embodiment of this invention. A description is simplified or omitted for a configuration having low relevance to this invention.

The illustrated attribute factor analysis device 100B can be realized by a computer configured to operate in accordance with program control. The attribute factor analysis device 100B has the same configuration as the attribute factor analysis device 100 illustrated in FIG. 1 for operation except that the configuration of the data processing device is different as described later. Thus, the data processing device is denoted by a reference numeral 20B. The same components as those illustrated in FIG. 1 are denoted by the same reference numerals, and a description thereof is omitted for the sake of simplicity of description.

The illustrated data processing device 20B includes a part division processing unit 22B, a case sample set reconstruction processing unit 24B, a dependency analysis processing unit 26B, and a visualization processing unit 28B.

The part division processing unit 22B is configured to divide the image region of image data into parts of a predetermined sample size while shifting the division position thereof by a predetermined number of pixels.

The case sample set reconstruction processing unit 24B is configured to obtain a case sample set reconstructed as described above for each of the shifted parts.

The dependency analysis processing unit 26B is configured to perform the analysis of dependency in parallel for each of the shifted parts, and to obtain a plurality of attribute factor analysis results.

The visualization processing unit 28B is configured to integrate (average) the plurality of attribute factor analysis results, visualize the integrated attribute factor analysis result, and produce the visualized attribute factor analysis result to the output device 30.

In this manner, the attribute factor analysis device 100B according to the third embodiment adjusts the division position.

Next, adjustment of this division position will be described in detail in comparison to the attribute factor analysis device 100 illustrated in FIG. 1.

Figure 7:
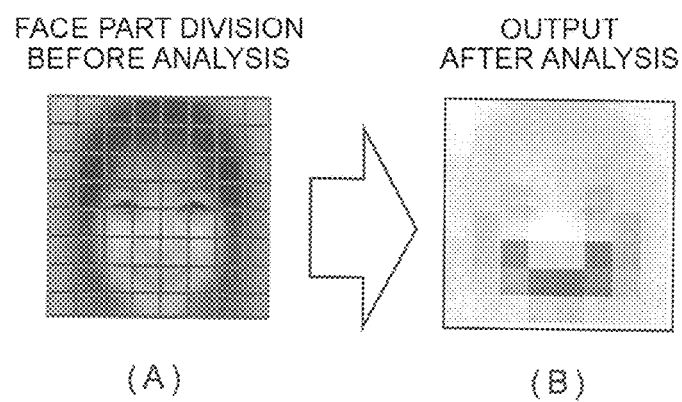
FIG. 7 shows diagrams for illustrating a division position in the attribute factor analysis device illustrated in FIG. 1.

FIG. 7 are diagrams for illustrating a division position in the attribute factor analysis device 100 illustrated in FIG. 1. FIG. 7(A) is an illustration of pieces of image data divided by the part division processing unit 22. FIG. 7(B) is an illustration of an attribute factor analysis result (visualized by the visualization processing unit 28) obtained by the dependency analysis processing unit 26.

As described above, the division position of a part is not always located in an appropriate position.

In the case of FIG. 7(A), a division line passes through a center line of the eyebrows, the nose, and the mouth. Thus, as illustrated in FIG. 7(B), it is difficult to identify the magnitudes of a correlation with the objective variable Y for pieces of part data, namely, the entire eyebrows, the entire nose, and the entire mouth.

Figure 8:
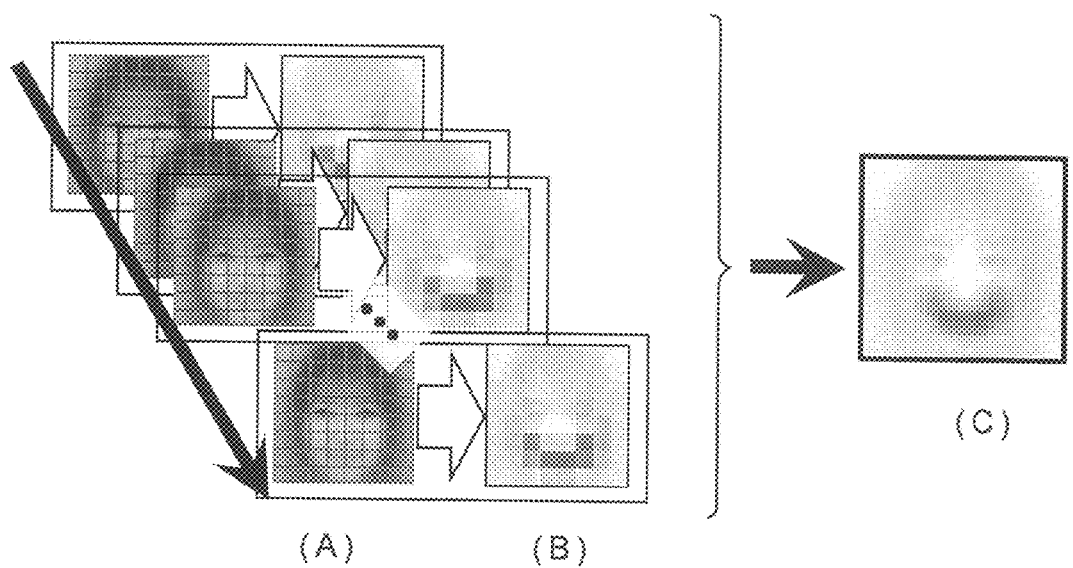
FIG. 8 shows diagrams for illustrating adjustment of a division position in the attribute factor analysis device illustrated in FIG. 6.

FIG. 8 are diagrams for illustrating adjustment of a division position in the attribute factor analysis device 100B illustrated in FIG. 6. FIG. 8(A) is an illustration of a plurality of divided pieces of image data, which are obtained by the part division processing unit 22B shifting the division position. FIG. 8(B) is an illustration of a plurality of attribute factor analysis results, which are obtained by the dependency analysis processing unit 26B performing the analysis of dependency in parallel. FIG. 8(C) is an illustration of an integrated attribute factor analysis result visualized by the visualization processing unit 28B.

As illustrated in FIG. 8(A), the part division processing unit 22B divides the image region of image data into parts of a predetermined sample size while shifting the division position thereof by a number of pixels (e.g., 2 pixels).

The case sample set reconstruction processing unit 24B obtains a case sample set reconstructed as described above for each of the shifted parts.

As illustrated in FIG. 8(B), the dependency analysis processing unit 26B performs the analysis of dependency in parallel for each of the shifted parts, and obtains a plurality of attribute factor analysis results.

As illustrated in FIG. 8(C), the visualization processing unit 28B integrates (averages pixels at the same position) the plurality of attribute factor analysis results (color matrix), visualizes the integrated attribute factor analysis result, and produces the visualized attribute factor analysis result to the output device 30.

In this manner, through integration of the plurality of attribute factor analysis results (color matrix), it is possible to present a comprehensible integrated (averaged) attribute factor analysis result (color matrix) that exhibits a gradient in display (red display).

The respective units of the attribute factor analysis device 100B according to the third embodiment may be implemented by using a combination of hardware and software. In the embodiment employing a combination of hardware and software, the respective units are implemented as various kinds of means by operating a piece of hardware, e.g., a control unit (CPU), based on an attribute factor analysis program stored in the ROM. Further, the attribute factor analysis program may be recorded in a recording medium for distribution. The attribute factor analysis program recorded in the recording medium is read into a memory in a wired or wireless manner, or via the recording medium itself, to thereby operate the control unit and other components. Examples of the recording medium include an optical disc, a magnetic disk, a semiconductor memory device, and a hard disk.

The attribute factor analysis device 100B configured in this manner according to the third embodiment can analyze the factor of an attribute (impression) in an easy-to-understand manner.

In the embodiments described above, processing of the embodiments may be executed by installing on a computer information stored in a computer-readable storage medium, which is coded with an instruction executable by a program, software, or a computer. The storage medium includes a transmission medium configured to temporarily record and hold data, e.g., a network, in addition to a portable recording medium such as an optical disc, a floppy (trademark) disk, and a hard disk.

Modified Example

While the invention has been particularly shown and described with reference to exemplary embodiments thereof, the invention is not limited to those embodiments. It will be understood by ordinary skill in the art that various changes in form and details may be made therein without departing from the spirit and scope of the present invention as defined by the claims.

For example, in the embodiments described above, a description is given with an example of a case in which the image region of each piece of image data is a square, but the image region of each piece of image data may be a rectangle.

Further, in the embodiments described above, the square image region of each piece of image data is divided into 64 pieces of square block image data of 8×8 pixels, but it is to be understood that the shape of block image data and the number of divisions are not limited thereto. For example, in general, a rectangle image region of each piece of image data may be divided into (M×N) pieces of, namely, M-by-N rectangle block image data. In this case, M and N are first and second integers of 2 or more, respectively. It is preferred that the first integer M and the second integer N be each 6 or more because too large a sample size inhibits the original purpose of analysis from being achieved.

Further, in the embodiments described above, a plurality of divided pieces of block image data have the same sample size, but it is to be understood that the sample sizes may be different from one another. Specifically, the image region of each piece of image data may be divided into a plurality of pieces of block image data of different sample sizes so that the division line does not pass through a characteristic part (e.g., mouth, eyes, and nose) of a face.

Further, in the embodiments described above, a description is given with an example of a case in which the image data is face image data and the attribute is an impression of a face, but it is to be understood that this invention is not limited thereto. The image data may be image data other than the facial image data, and the attribute may be an attribute other than the impression.

INDUSTRIAL APPLICABILITY

This invention can be applied to, for example, a make-up simulation or giving flexible advice on make-up improvement in accordance with the intention (e.g., an ideal image) of a customer.

REFERENCE SIGNS LIST 10 input device
20, 20A, 20B data processing device
22, 22A, 22B part division processing unit
222 sample size adjustment unit
24, 24B case sample set reconstruction processing unit
26, 26B dependency analysis processing unit
28, 28B visualization processing unit
30 output device
40 auxiliary storage device
100, 100A, 100B attribute factor analysis device

What is claimed is:

1. An attribute factor analysis method, which is a method of analyzing a factor of an attribute with use of an attribute factor analysis device based on a case sample set containing combinations of image data and attribute data associated with the image data, the attribute factor analysis method comprising:
    dividing an image region of the image data forming each element of the case sample set into parts in a mesh shape of a predetermined sample size without overlapping;
    reconstructing, based on the case sample set, the case sample sets for the respective parts so as to use an objective variable as it is as the attribute data to obtain reconstructed case sample sets each of which comprises a combination of an explanatory variable representing a feature value of image data on each part and the objective variable;
    analyzing, for each of the reconstructed case sample sets, a dependency between the explanatory variable and the objective variable representing the attribute data, to thereby obtain an attribute factor analysis result; and
    visualizing the attribute factor analysis result to produce the visualized attribute factor analysis result,
    wherein the analyzing comprises analyzing the dependency by any selected one of calculating a correlation value in a sub-space of canonical correlation analysis, calculating mutual information, and calculating squared-loss mutual information.

2. The attribute factor analysis method according to claim 1, wherein the dividing comprises adjusting the predetermined sample size by previously calculating a magnitude of a correlation between the explanatory variable and the objective variable for the image data on each part.

3. The attribute factor analysis method according to claim 1,
    wherein the dividing comprises dividing the image region of the image data into the parts of a predetermined sample size while shifting a division position of the image region of the image data by a predetermined number of pixels,
    wherein the reconstructing comprises obtaining the reconstructed case sample sets for the respective shifted parts,
    wherein the analyzing comprises obtaining a plurality of attribute factor analysis results by analyzing the dependency in parallel for the respective shifted parts, and
    wherein the visualizing comprises integrating the plurality of attribute factor analysis results and visualizing the integrated attribute factor analysis result to produce the visualized attribute factor analysis result.

4. The attribute factor analysis method according to claim 1, wherein the feature value of image data comprises any selected one of feature values comprising RGB, gray scale, Laplacian, and Haar-like feature value.

5. The attribute factor analysis method according to claim 1, wherein the image data comprises facial image data.

6. The attribute factor analysis method according to claim 5, wherein the attribute data comprises data representing an impression of a face.

7. The attribute factor analysis method according to claim 6, wherein the impression comprises at least one selected from among impressions comprising "cheerfulness and friendliness", "prettiness", "business appropriateness", "kindness", and "healthy appearance".

8. An attribute factor analysis device, which is configured to analyze a factor of an attribute based on a case sample set containing combinations of image data and attribute data associated with the image data, the attribute factor analysis device comprising:
    a part division processing circuitry configured to divide an image region of the image data forming each element of the case sample set into parts in a mesh shape of a predetermined sample size without overlapping;
    a case sample set reconstruction processing circuitry configured to reconstruct, based on the case sample set, the case sample sets for the respective parts so as to use an objective variable as it is as the attribute data to obtain reconstructed case sample sets each of which comprises a combination of an explanatory variable representing a feature value of image data on each part and the objective variable;
    a dependency analysis processing circuitry configured to analyze, for each of the reconstructed case sample sets, a dependency between the explanatory variable and the objective variable representing the attribute data, to thereby obtain an attribute factor analysis result; and
    a visualization processing circuitry configured to visualize the attribute factor analysis result to produce the visualized attribute factor analysis result,
    wherein the dependency analysis processing circuitry is configured to analyze the dependency by any selected one of calculating a correlation value in a sub-space of canonical correlation analysis, calculating mutual information, and calculating squared-loss mutual information.

9. The attribute factor analysis device according to claim 8, wherein the part division processing circuitry comprises a sample size adjustment unit configured to adjust the predetermined sample size by previously calculating a magnitude of a correlation between the explanatory variable and the objective variable for the image data on each part.

10. The attribute factor analysis device according to claim 8,
    wherein the part division processing circuitry is configured to divide the image region of the image data into the parts of a predetermined sample size while shifting a division position of the image region of the image data by a predetermined number of pixels, wherein the case sample set reconstruction processing circuitry is configured to obtain the reconstructed case sample sets for the respective shifted parts, wherein the dependency analysis processing circuitry is configured to obtain a plurality of attribute factor analysis results by analyzing the dependency in parallel for the respective shifted parts, and wherein the visualization processing circuitry is configured to integrate the plurality of attribute factor analysis results, to visualize the integrated attribute factor analysis result, and to produce the visualized attribute factor analysis result.

11. The attribute factor analysis device according to claim 8, wherein the feature value of image data comprises any selected one of feature values comprising RGB, gray scale, Laplacian, and Haar-like feature value.

12. The attribute factor analysis device according to claim 8, wherein the image data comprises facial image data.

13. The attribute factor analysis device according to claim 12, wherein the attribute data comprises data representing an impression of a face.

14. The attribute factor analysis device according to claim 13, wherein the impression comprises at least one selected from among impressions comprising "cheerfulness and friendliness", "prettiness", "business appropriateness", "kindness", and "healthy appearance".

15. A non-transitory computer readable recording medium for storing an attribute factor analysis program for causing a computer to analyze a factor of an attribute based on a case sample set containing combinations of image data and attribute data associated with the image data, the attribute factor analysis program causing the computer to execute:

a division procedure of dividing an image region of the image data forming each element of the case sample set into parts in a mesh shape of a predetermined sample size without overlapping;

a reconstruction procedure of reconstructing, based on the case sample set, the case sample sets for the respective parts so as to use an objective variable as it is as the attribute data to obtain reconstructed case sample sets each of which comprises a combination of an explanatory variable representing a feature value of image data on each part and the objective variable;

an analysis procedure of analyzing, for each of the reconstructed case sample sets, a dependency between the explanatory variable and the objective variable representing the attribute data, to thereby obtain an attribute factor analysis result; and a visualization procedure of visualizing the attribute factor analysis result to produce the visualized attribute factor analysis result, wherein the analysis procedure comprises causing the computer to analyze the dependency by any selected one of calculating a correlation value in a sub-space of canonical correlation analysis, calculating mutual information, and calculating squared-loss mutual information.

16. The non-transitory computer readable recording medium according to claim 15, wherein the division procedure comprises further causing the computer to execute an adjustment procedure of adjusting the predetermined sample size by previously calculating a magnitude of a correlation between the explanatory variable and the objective variable for the image data on each part.

17. The non-transitory computer readable recording medium according to claim 15, the division procedure comprises causing the computer to divide the image region of the image data into the parts of the predetermined sample size while shifting a division position of the image region of the image data by a predetermined number of pixels, the reconstruction procedure comprises causing the computer to obtain the reconstructed case sample sets for the respective shifted parts, the analysis procedure comprises causing the computer to obtain a plurality of attribute factor analysis results by analyzing the dependency in parallel for the respective shifted parts, and the visualization procedure comprises causing the computer to integrate the plurality of attribute factor analysis results, to visualize the integrated attribute factor analysis result, and to produce the visualized attribute factor analysis result.

18. The non-transitory computer readable recording medium according to claim 15, wherein the feature value of image data comprises any selected one of feature values comprising RGB, gray scale, Laplacian, and Haar-like feature value.

19. The non-transitory computer readable recording medium according to claim 15, wherein the image data comprises facial image data.

20. The non-transitory computer readable recording medium according to claim 19, wherein the attribute data comprises data representing an impression of a face.

21. The non-transitory computer readable recording medium according to claim 20, wherein the impression comprises at least one selected from among impressions comprising "cheerfulness and friendliness", "prettiness", "business appropriateness", "kindness", and "healthy appearance".

* * * * *